H. RUST.
CORN GATHERING MACHINE.
APPLICATION FILED FEB. 24, 1912.

1,046,335.

Patented Dec. 3, 1912.

2 SHEETS—SHEET 1.

Fig 2. x-x

WITNESSES

INVENTOR
HENRY RUST
BY Paul & Paul
ATTORNEYS

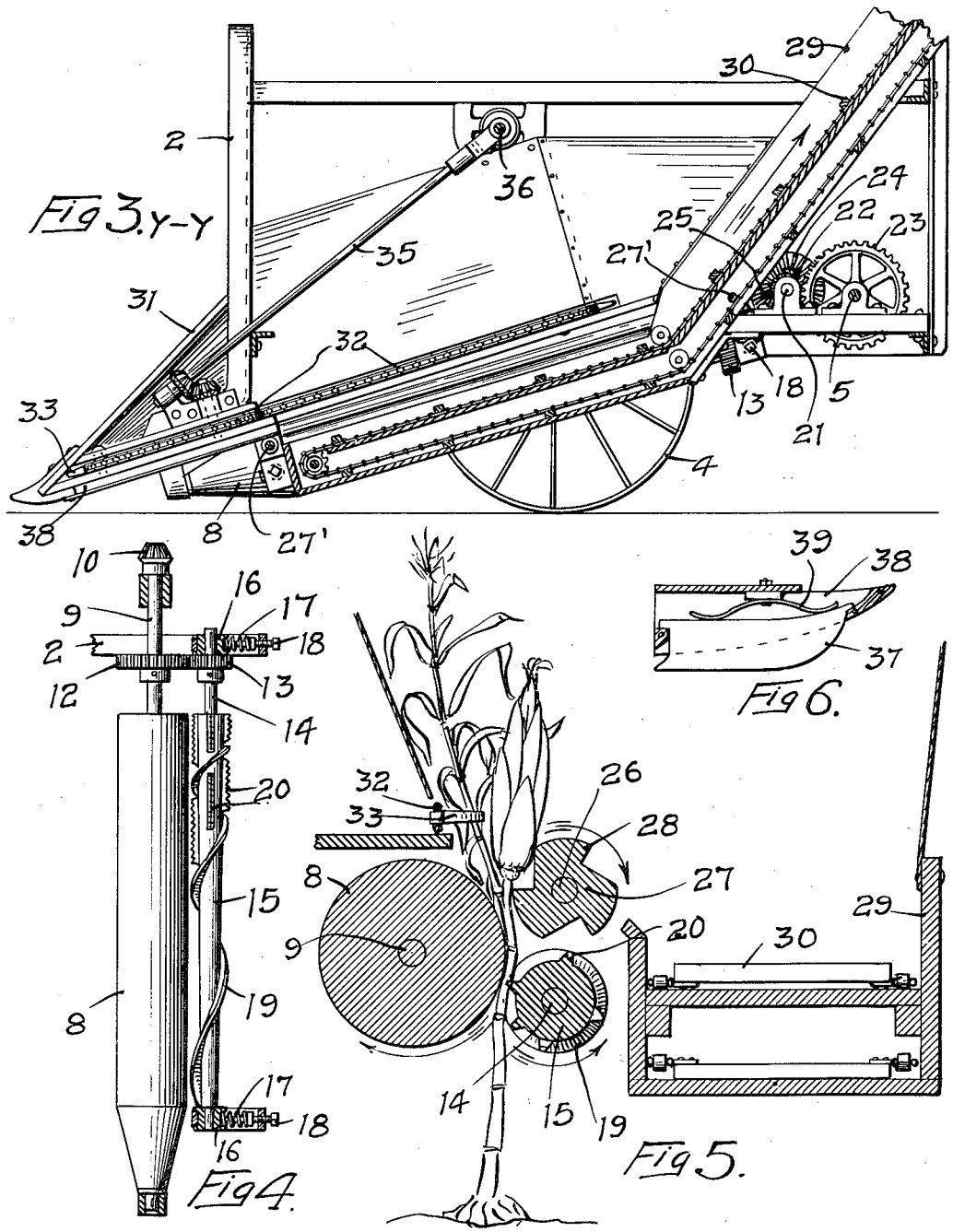

UNITED STATES PATENT OFFICE.

HENRY RUST, OF WORTHINGTON, MINNESOTA.

CORN-GATHERING MACHINE.

1,046,335.  Specification of Letters Patent.  Patented Dec. 3, 1912.

Application filed February 24, 1912. Serial No. 679,713.

*To all whom it may concern:*

Be it known that I, HENRY RUST, of Worthington, Nobles county, Minnesota, have invented certain new and useful Improvements in Corn-Gathering Machines, of which the following is a specification.

The object of my invention is to improve the machine covered by Patent No. 815,220, issued to me March 13, 1906.

The invention consists generally in a snapping roll rotating at a comparatively high rate of speed, and a second roll rotating in the same direction at a slower speed.

Further the invention consists in various constructions and combinations, all as hereinafter described and particularly pointed out in the claims.

Figure 1:
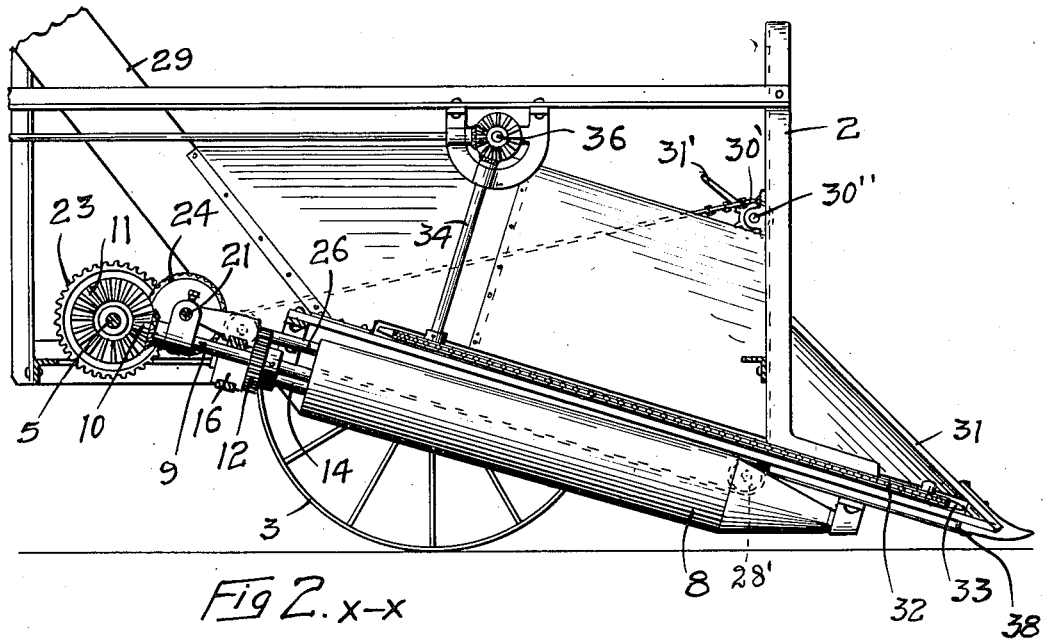
Figure 1:
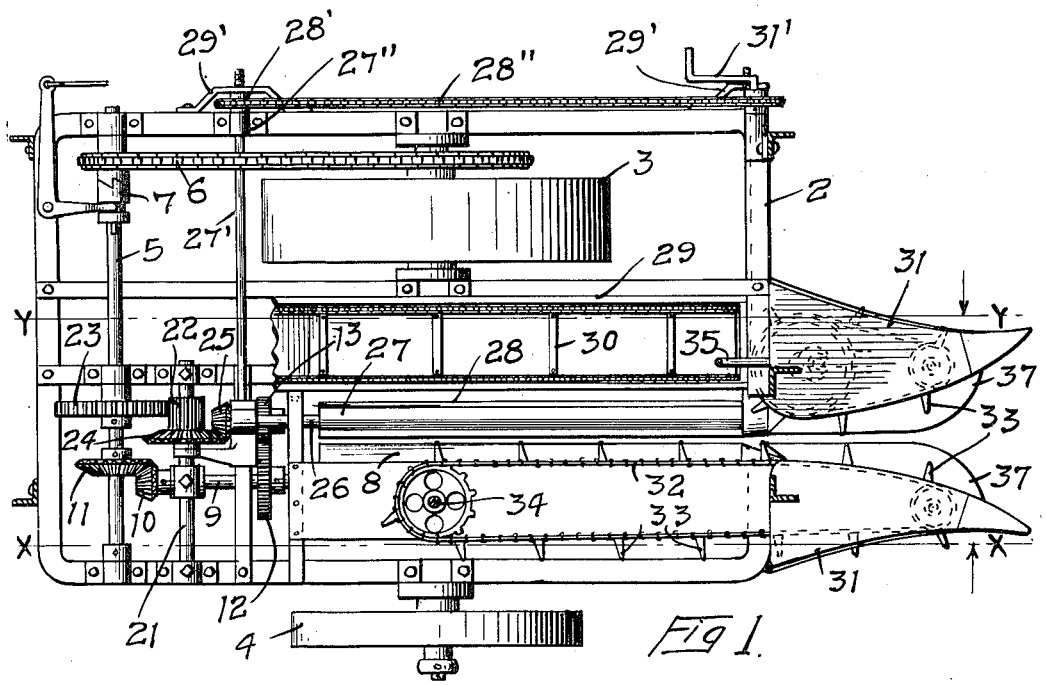

In the accompanying drawings forming part of this specification, Figure 1 is a plan view of the lower portion of a machine embodying my invention, Fig. 2 is a longitudinal vertical section on the line *x—x* of Fig. 1, looking in the direction of the arrow, Fig. 3 is a similar view, looking toward the opposite side of the machine, on the line *y—y* of Fig. 1, Fig. 4 is a detail plan view of the rolls, the snapping roll being removed to expose the roll beneath it, Fig. 5 is a transverse sectional view, illustrating the operation of the rolls, Fig. 6 is a detail sectional view, showing the means operating in connection with the gathering devices for engaging ears which may be low down on the stalk or close to the ground.

In the drawing, 2 represents the frame of the machine, having a traction wheel 3 and a carrying wheel 4.

5 is a transverse shaft, driven by a belt 6 from the traction wheel, as usual in machines of this type. The operation of this shaft is controlled by a clutch 7.

8 represents a comparatively large rotating, smooth-surfaced roll, journaled in stationary bearings and having a shaft 9 provided with a beveled pinion 10 which meshes with a beveled gear 11 on the shaft 5. A gear 12 is secured on the shaft 9 and meshes with a pinion 13 on a shaft 14 of a roll 15. This shaft 14 is journaled in movable bearings 16 and is yieldingly held toward the roll 8 by springs 17. The tension of these springs is regulated by adjusting screws 18. The roll 15 is provided with a longitudinal, spirally arranged rib 19, extending from end to end of the roll and between the convolutions of the spiral I prefer to provide toothed blades or webs 20, also extending lengthwise of the roll. This roll is also preferably tapered from its upper toward its lower end, its driving connection with the shaft 9 operating to rotate the roll in the opposite direction from the movement of the roll 8. A shaft 21 is journaled in the frame of the machine, parallel with the shaft 5, and has a pinion 22 secured thereon meshing with a comparatively large gear 23 on the shaft 5. A beveled gear 24 is mounted on the shaft 21 and meshes with a beveled pinion 25 on the shaft 26 of a roll 27 that is journaled in adjustable bearings above the roll 15. This roll has a series of ribs 28 formed thereon by means of longitudinal recesses and is driven in the same direction as the roll 8 but at a greater speed. The bearings of the roll 27 are connected to rods 27' extending transversely of the machine and slidable in guides 27'' and having threaded ends to receive the interiorly threaded hubs of sprocket wheels 28'. These sprocket wheels are held against movement transversely of the machine by brackets 29' and are free to revolve and move the rods lengthwise, and adjust the roll 27 toward or from the roll 8 to increase or decrease the distance between these rolls, according to the size or character of the stalks on which the machine is working. A sprocket belt 28'' passes over a sprocket 30', (see Fig. 2) mounted on a spindle 30'', and a crank 31' is provided for revolving this spindle and the sprocket wheels and moving the rods 27' in or out to change the position of the roll 27.

A carrier frame 29 is located near the rolls 27 and 15 and an elevator 30 operates within said frame and is adapted to receive ears of corn from the roll 27. The lower portion of this elevator operates at an incline parallel, substantially, with the rolls and the upper portion is elevated at a sharper angle to convey the ears to husking devices, which I have not thought necessary to illustrate in this application, as they form no part of my present invention.

At the forward portion of the machine are gathering plates 31 with a space between them, and gathering belts 32 having fingers 33 thereon are mounted to operate beneath said plates, said fingers projecting into the space between them, as usual in machines of this type. The gathering belts are driven through shafts 34 and 35 having driving connections with a shaft 36. Beneath the gathering plates 31 are plates 37 slidably mounted in shoes 38 and yieldingly held toward one another by springs 39. These springs press the plates 37 into a position where they will gather up the ears which are low down on the stalks or those which may be hanging close to the ground, and direct them with their stalks in between the rolls 8 and 15, the upper portions of the stalks being carried forward by the gathering fingers 33. The movement of the large roll, rotating toward the roll 27 will coöperate with the corrugations 28 to snap the ears from the stalks, and this movement of the upper rolls in the same direction will prevent the ears from being drawn down between them and crushed, and will also prevent clogging of the rolls. During this operation of the upper rolls the roll 15 coöperating with the roll 8 will grip the stalk and exert a downward pull thereon and aid in separating the ears therefrom. The roll 27, rotating at a much faster speed than the roll 8, will throw the ears as they are snapped off the stalks on to the moving carrier 30, on which they are carried to the rear of the machine. I have found with the rolls arranged and operated in this way, that the ears will be rapidly stripped from the stalks and thrown upon the carrier without danger of crushing, which frequently occurs where the rolls rotate toward one another, and also without danger of clogging the rolls or the machine.

I have shown a comparatively large, low speed roll rotating toward the snapping roll and coöperating with the roll beneath the snapping roll to grip the stalks and exert a downward pull thereon. I do not wish to be confined to this construction, as obviously some other means may be employed to coöperate with the roll 15 than the low speed roll and still be within the scope of my invention.

I claim as my invention:—

1. The combination, with a gathering mechanism, of two rolls between which the corn stalks are fed, one of said rolls rotating at a comparatively low speed, the other roll rotating at a greater angular velocity and in the same direction as said first named roll, and means located below said high speed roll between which and said low speed roll the stalks are gripped.

2. The combination, with a gathering mechanism, of two rolls between which the corn stalks are fed, one of said rolls rotating at a comparatively low speed and the other roll rotating at a greater angular velocity and in the same direction as said first named roll, said high speed roll operating to snap the ears of corn from the stalks between said rolls.

3. The combination, with a gathering mechanism, of two rolls having coöperating peripheral surfaces rotating in the same direction between which the stalks are fed, one of said rolls being smaller than the other roll and operating to snap the ears from the stalks, and a third roll located beneath the smaller roll and coöperating with the larger roll to hold the stalks during the snapping operation.

4. The combination, with a gathering mechanism, of a comparatively large roll rotating at a comparatively low speed, a smaller roll contiguous thereto and rotating at a greater angular velocity and having a corrugated surface and operating to engage the ears and snap them from the stalks, and a roll disposed beneath said snapping roll and having means coöperating with said large roll to engage and draw the stalk downwardly during the snapping operation.

5. The combination, with a gathering means, of rolls between which the corn stalks are fed, a carrier arranged near said rolls, two of said rolls having their upper portions rotating toward said carrier at different angular velocity, the higher speed roll operating to snap the ears from the stalks and throw them upon said carrier, and means below said higher speed roll coöperating with said lower speed roll for gripping the stalks during the snapping operation.

6. The combination, with a gathering means, of rolls between which the corn stalks are fed, two of said rolls rotating in the same direction and one at a greater angular velocity than the other and operating to snap the ears from the stalks, and a roll disposed beneath said snapping roll and having yieldingly mounted bearings and coöperating with said lower speed roll to grip the stalks and pull them downwardly during the ear snapping operation.

7. The combination, with a gathering mechanism, of rolls, operating at different angular velocity, between which the corn stalks are fed, said rolls being arranged side by side and rotating in the same direction, one of said rolls having movable bearings, and means for adjusting said bearings to increase or decrease the distance between said rolls.

8. The combination, with a gathering mechanism, of two rolls between which the corn stalks are fed, one of said rolls rotating at a comparatively low speed and the other roll rotating at a greater angular velocity and in the same direction as said first named roll and provided with peripheral recesses.

9. The combination, with a gathering mechanism, of rolls arranged side by side between which the corn stalks are fed, said rolls rotating in the same direction, but at different angular velocity, a carrier arranged adjacent to said rolls, the rotation of the roll next to said carrier being faster than the other roll and operating to direct the ears from between said rolls to said carrier.

10. The combination, with a gathering mechanism, of rolls between which the corn stalks are fed, said rolls being arranged side by side and rotating in the same direction to snap the ears from the stalks between them, a carrier device provided at one side of said rolls and whereto the ears are delivered, the roll adjacent to said carrier device operating at a different angular velocity than the other roll.

In witness whereof, I have hereunto set my hand this 13th day of February 1912.

HENRY RUST.

Witnesses:
  S. S. SMITH,
  J. J. KIES.